United States Patent [19]
Niimi

[11] Patent Number: 5,587,189
[45] Date of Patent: Dec. 24, 1996

[54] MOLDING DEVICE FOR REGISTER OF SYNTHETIC RESIN

[75] Inventor: Hideki Niimi, Nisio, Japan

[73] Assignee: Wako Plastics Industries Co., Ltd., Aichi-ken, Japan

[21] Appl. No.: 544,819

[22] Filed: Oct. 18, 1995

[30] Foreign Application Priority Data

Oct. 19, 1994 [JP] Japan .................................... 6-253681

[51] Int. Cl.⁶ .......................... B29C 45/33; B29C 45/36; B29C 45/44
[52] U.S. Cl. ..................... 425/577; 249/64; 249/180; 249/184; 425/450.1; 425/DIG. 10
[58] Field of Search ..................................... 425/577, 468, 425/DIG. 10, DIG. 59, 450.1, 441; 249/64, 59, 184, 180

[56] References Cited

U.S. PATENT DOCUMENTS

| | | | |
|---|---|---|---|
| 4,206,799 | 6/1980 | McDonald | 425/468 |
| 4,362,291 | 12/1982 | Fuke et al. | 425/577 |
| 4,502,660 | 3/1985 | Luther et al. | 425/577 |
| 4,840,557 | 6/1989 | Ishimoto et al. | 425/577 |
| 4,889,480 | 12/1989 | Nakamura et al. | 425/450.1 |
| 4,923,388 | 5/1990 | Nakamura | 425/577 |
| 5,397,226 | 3/1995 | Vandenberg | 425/577 |

*Primary Examiner*—Khanh P. Nguyen
*Attorney, Agent, or Firm*—Hazel & Thomas, PC

[57] ABSTRACT

A molding device for a register of synthetic resin adapted for use in adjustment of air flow, wherein a pair of outer frame members, a plurality of spaced adjustment blades and a link member of the register are separately formed and assembled during a molding process without manual work required heretofore for connecting the link member with the adjustment blades for interconnection thereof.

3 Claims, 9 Drawing Sheets

MOLDING DEVICE FOR REGISTER OF SYNTHETIC RESIN

BACKGROUND OF THE INVENTION

1. Field of the Invention

The present invention relates to a molding device for a register of synthetic resin which is coupled with an outlet of an air duct for adjustment or the flow of heated air or cooled air released therefrom.

2. Description of the Prior Art

Disclosed in Japanese Patent Publication Nos. 2(1990)-58549 and 4(1992)-69542 is a resister of synthetic resin for adjustment of air flow the outer frame assembly of which is comprised of a pair of outer frame members coupled with each other at their opposed side wall portions. During assembly processes of the register, a plurality of adjustment blades are separately formed and assembled within the outer frame assembly during a molding process of the outer frame members. In the register, however, the adjustment blades are interconnected by means of a link member engaged therewith after the register assembly has been removed from the molding device. It is, therefore, required to position the adjustment blades in the same direction for engagement with the link member after removed from the molding device. This results in an increase of manufacturing cost of the register.

SUMMARY OF THE INVENTION

It is, therefore, a primary object of the present invention to provide an improved molding device for the register of synthetic resin, wherein the frame members, adjustment blades and link member are separately formed and assembled during a molding process without manual work for interconnection of the adjustment blades.

According to the present invention, the primary object is accomplished by providing a molding device for a register of synthetic resin adapted for use in adjustment of air flow, the register being comprised of an outer frame assembly, a plurality of spaced adjustment blades assembled within the outer frame assembly to be pivotally moved and a link member pivotally engaged with each rear shoulder of the adjustment blades for interconnection of the adjustment blades, the outer frame assembly being comprised of a pair of outer frame members each having a frame body integral with a pair of opposed side wall portions and being integrally coupled with each other at their side wall portions to form the outer frame assembly, wherein the molding device comprises a pair of opposed first slide cores each formed with a molding surface forming each frame body of the outer frame members, a pair of opposed second slide cores arranged perpendicularly to the first slide cores, the second slide cores each being formed with a molding surface forming each side wall portion of the outer frame members, a third slide core positioned adjacent one of the first slide cores, the third slide core being formed with a molding surface forming the link member, and a core block arranged to be disposed between the first and second slide cores, the core block being formed with a molding surface forming the adjustment blades, and wherein the molding device further comprises first actuator means for moving the first slide cores toward and away from the core block so that in a condition where the first slide cores have been moved toward the core block, the outer frame members are coupled with each other at their side wall portions and engaged with the adjustment blades carried by the core block; guide means for moving the second slide cores outwardly when the core block has been retracted; and second actuator means for moving the third slide core toward the core block so that the link member is engaged with each rear shoulder of the adjustment blades carried by the core block.

BRIEF DESCRIPTION OF THE DRAWINGS

Other objects, features and advantages of the present invention will be more readily appreciated from the following detailed description of a preferred embodiment thereof when taken together with the accompanying drawings, in which.

Figure 1:
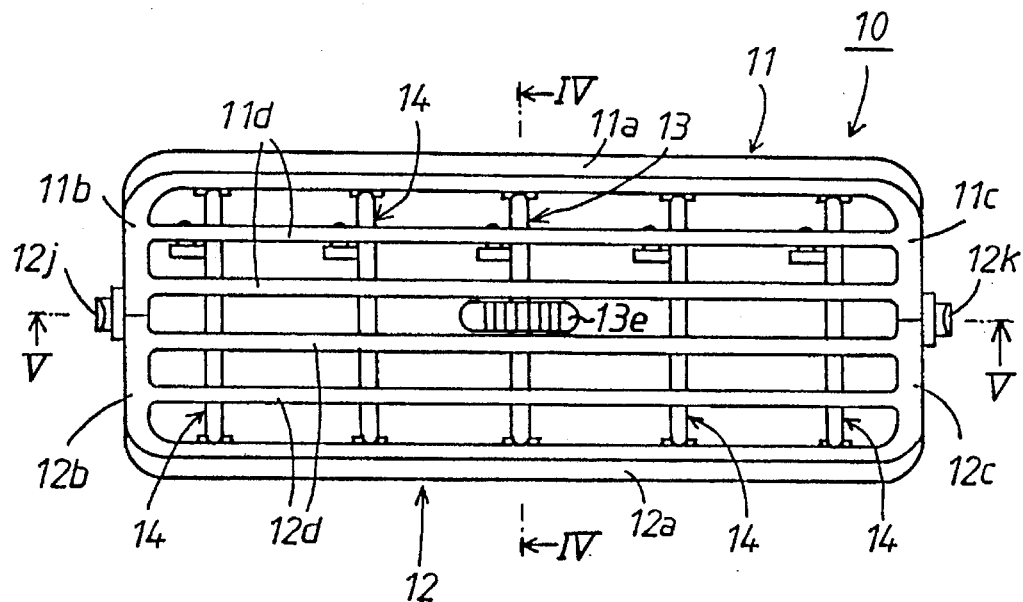
FIG. 1 is a front view of a register in accordance with the present invention.
Figure 7:
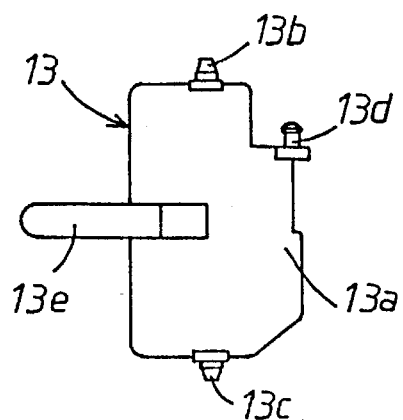
Figure 7:
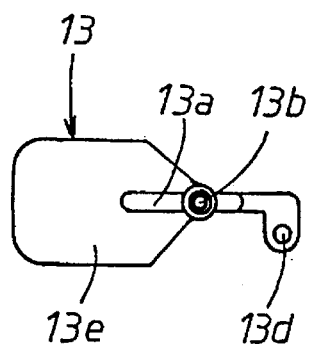
Figure 7:
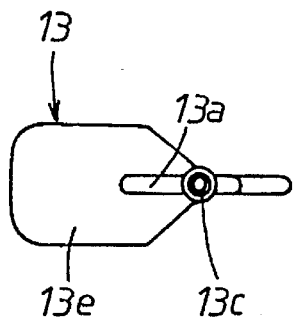
Figure 8:
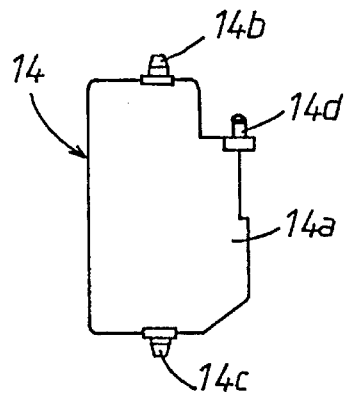
Figure 8:
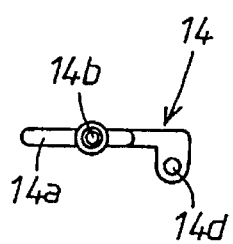
Figure 8:
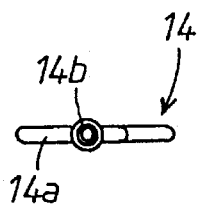
Figure 9:
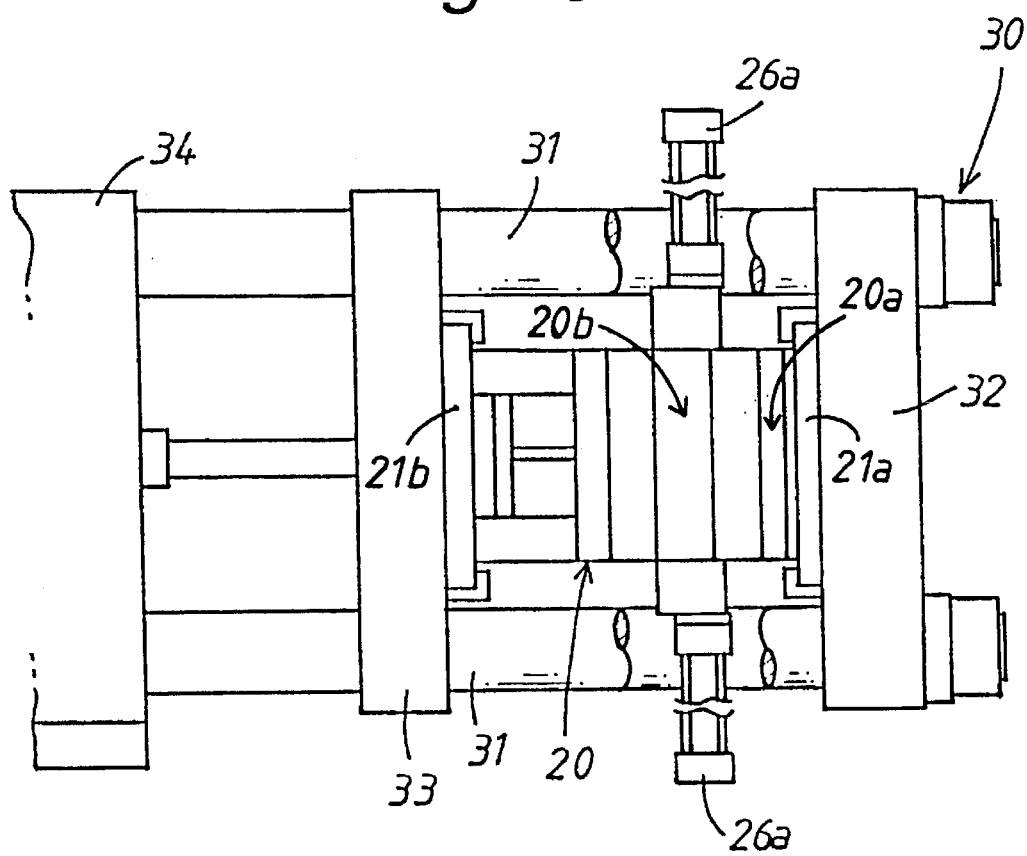
Figure 10:
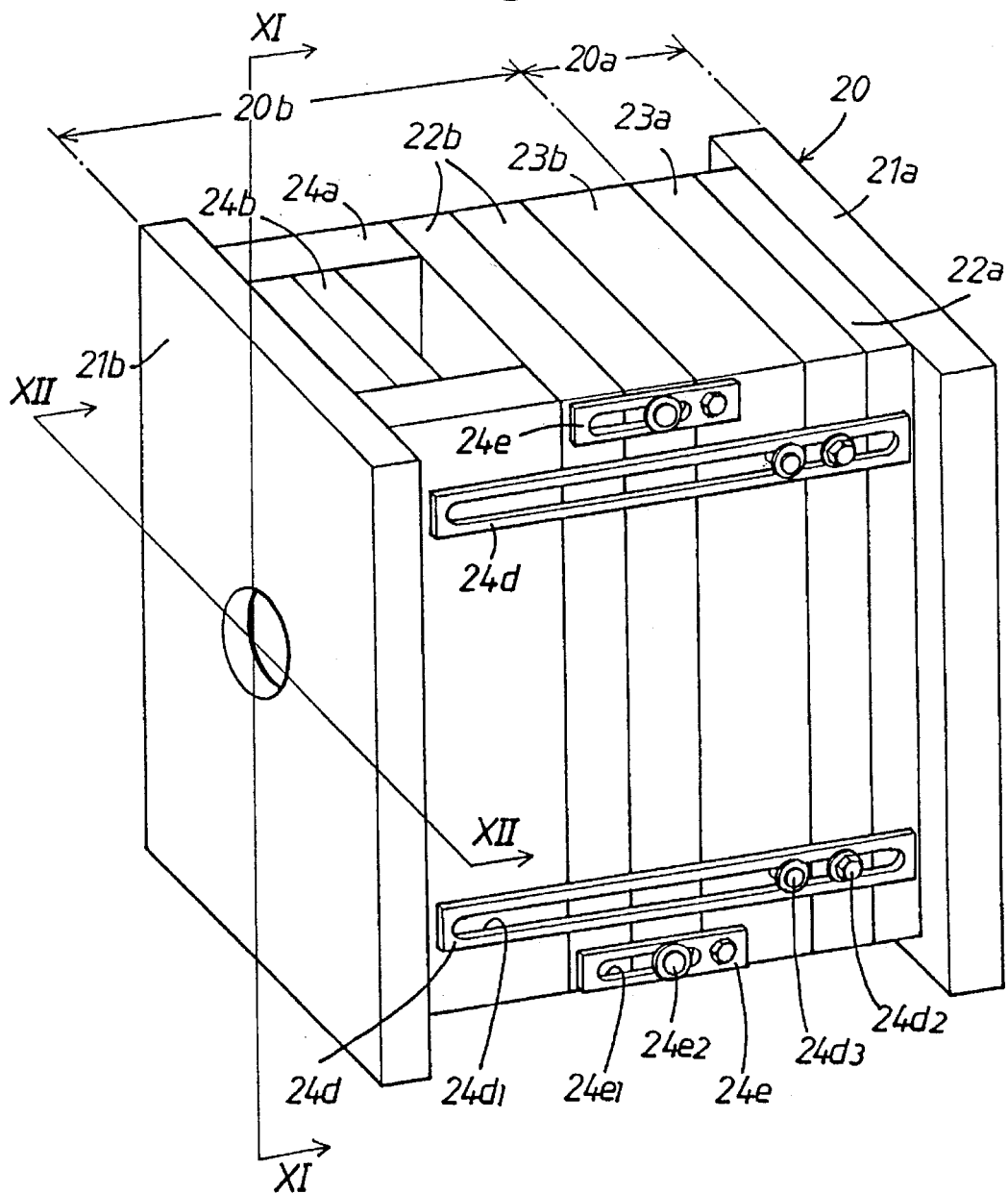
Figure 11:
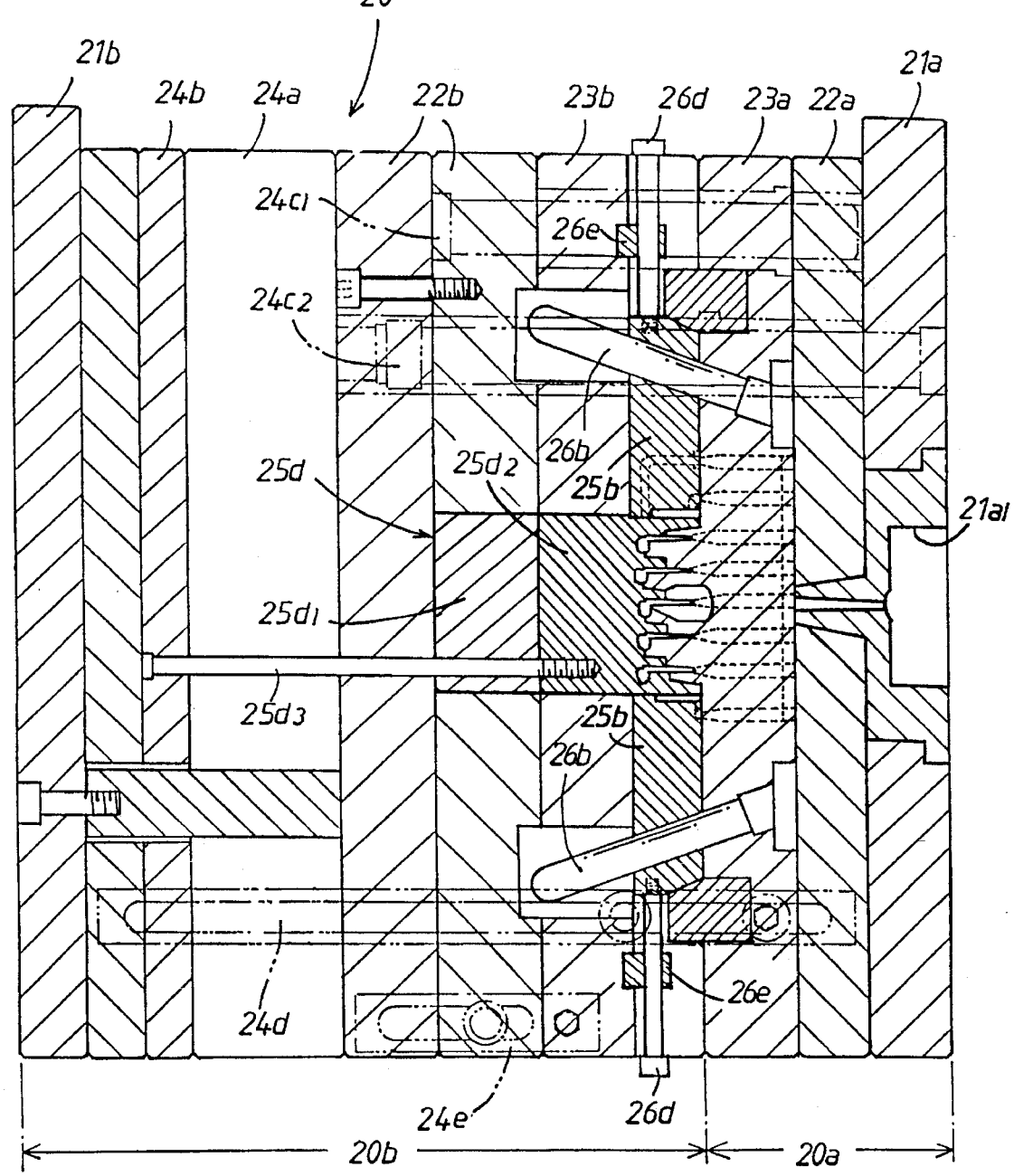
Figure 12:
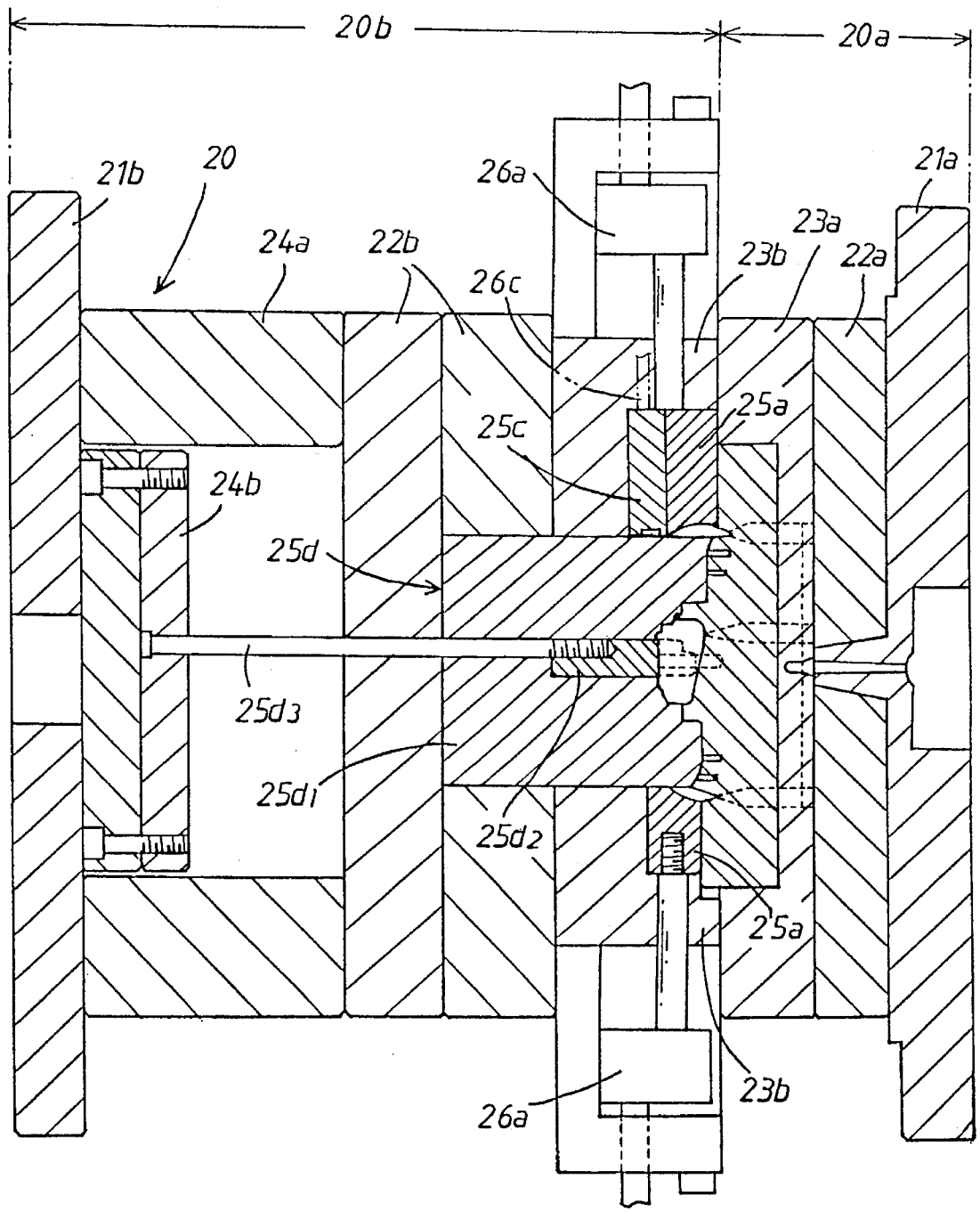

FIG, 6(b) is a cross-sectional view of a jointed portion of upper and low frame members shown in FIG. 1;

FIG. 7(a) is a side view of a central adjustment blade of the register;

FIG. 7(b) is a plan view of the central adjustment blade;

FIG. 7(c) is a bottom view of the central adjustment blade;

FIG. 8(a) is a side view of a side adjustment blade of the register;

FIG. 8(b) is a plan view of the side adjustment blade:

FIG. 8(c) is a bottom view of the side adjustment blade;

FIG. 9 is a plan view of a molding device for the register shown in FIG. 1;

FIG. 10 is a perspective view of the molding device shown in FIG. 9;

FIG. 11 is a vertical sectional view of the molding device taken along line XI—XI in FIG. 10; and FIG. 12 is a cross-sectional view taken along line XII—XII in FIG. 10.

DETAILED DESCRIPTION OF THE PREFERRED EMBODIMENT

In FIG. 1 of the drawings, there is illustrated a preferred embodiment of a register 10 which is comprised of a split type outer frame assembly, central and side adjustment blades 13, 14 and a link member 15. All the component parts of the register 10 are made of synthetic resin. The split type outer frame assembly is comprised of upper and lower frame members 11 and 12. The upper frame member 11 has an upper frame body 11a, a pair of opposed side wall portions 11b, 11c integrally formed with the upper frame body 11a and a plurality of lattice members 11d integrally formed with the side wall portions 11b, 11c in parallel with the upper frame body 11a. Similarly, the lower frame member 12 has a lower frame body 12a, a pair of opposed side wall portions 12b, 12c integrally formed with the lower frame body 12a and a plurality of lattice members 12d integrally formed with the side wall portions 12b, 12c in parallel with the lower frame body 12a.

Figure 2:
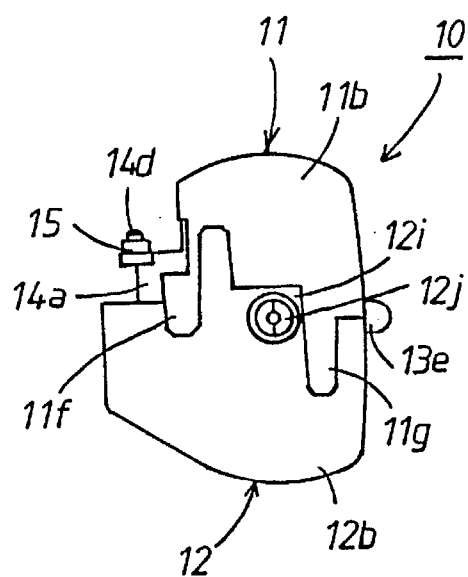
FIG. 2 is a left side view of the register shown in FIG. 1.
Figure 3:
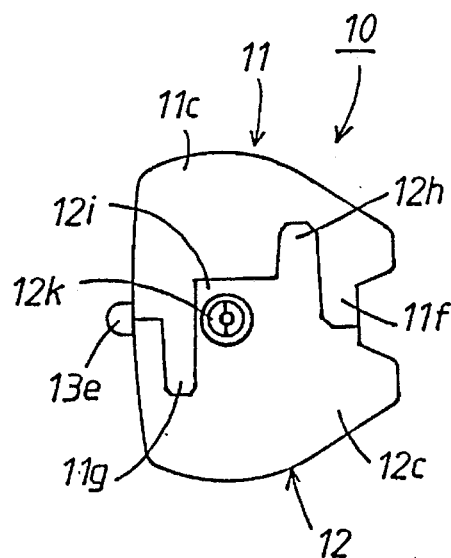
FIG. 3 is a right side view of the register shown in FIG. 1.
Figure 4:
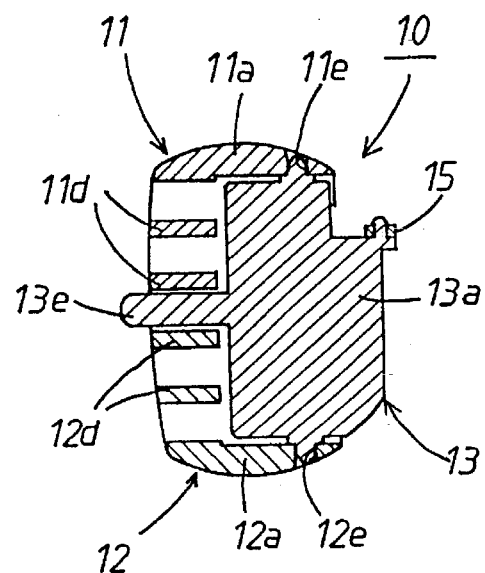
FIG. 4 is a vertical sectional view taken along line IV—IV in FIG. 1.
Figure 5:
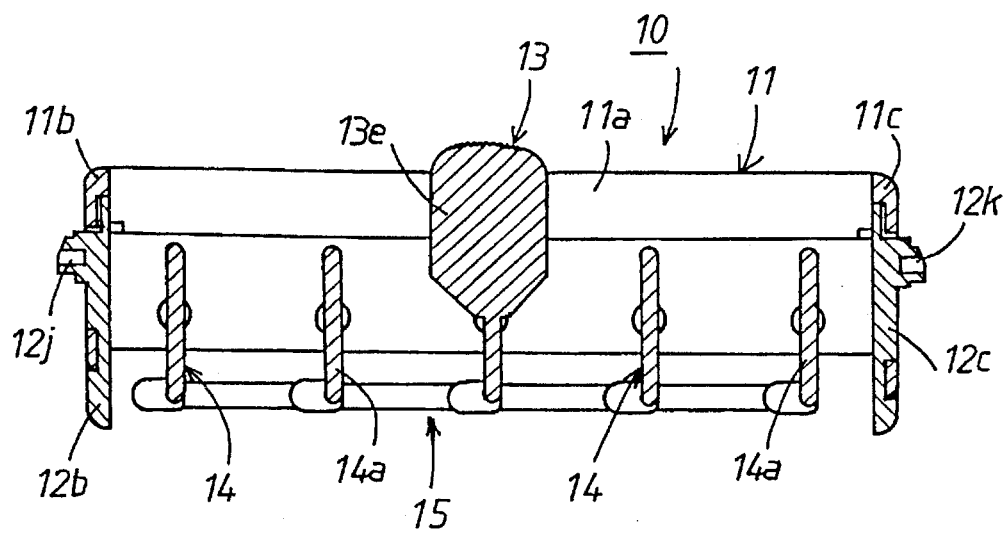
FIG. 5 is a cross-sectional view taken along line V—V in FIG. 1.

As shown in FIG. 4, the upper frame member 11 is formed with a plurality of laterally equally spaced holes 11e. As shown in FIGS. 2 and 3, both the side wall portions 11b, 11c each are formed with a first leg portion 11f extending downwardly at the backside of the outer frame assembly and a second leg portion 11g extending downwardly at the front side of the outer frame assembly. As shown in FIG. 6(A), the side wall portions 11b, 11c each are further formed with first and second recesses 11h, 11i located between the first and second leg portions 11f and 11g. The first recess 11h is formed with a hook 11h1 the front surface of which is tapered as shown in FIG. 6(b). The second leg portion 11g is formed with a hook 11g1 the front surface of which is tapered in the same manner as in the hook 11h1 of recess 11h.

Figure 6:
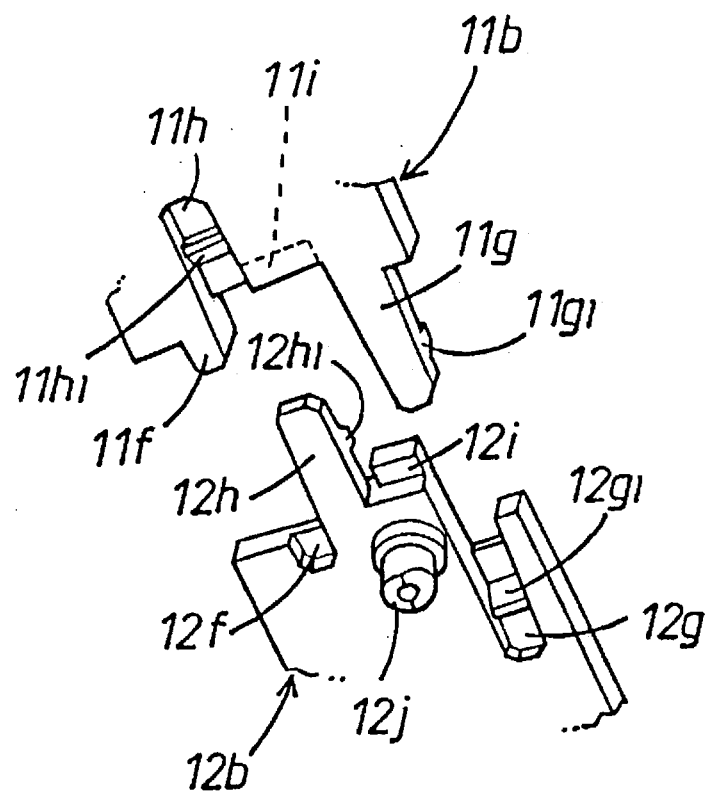
FIG. 6(a) is a perspective view illustrating each joint portion of upper and lower frame members shown in FIG. 1.
Figure 6:
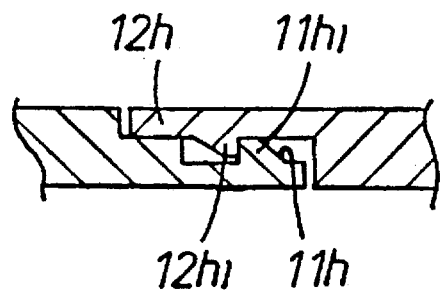

As shown in FIG. 4, the lower frame member 12 is formed with a plurality of laterally equally spaced holes 12e. As shown in FIGS. 2 and 6 (a), both the side wall portions 12b, 12c of lower frame member 12 each are formed with a first recess 12f to be engaged with the corresponding first leg portion 11f of upper frame member 11, a first leg portion 12h to be engaged with the corresponding first recess 11h, a second leg portion 12i to be engaged with the corresponding second recess 11i and a second recess 12g to be engaged with the corresponding second leg portion 11g. The first leg portion 12h and recess 12g are respectively formed with hooks 12h1, 12g1 each front surface of which is tapered to be engaged with the hooks 11h1, 11g1. Illustrated in FIG. 6(b) is an engaged condition of the hook 11h1 of recess 11h with the corresponding hook 12h1 of leg portion 12h. The lower frame member 12 is integrally formed with a pair of laterally spaced support shafts 12j, 12k which are located adjacent the second leg portion 12i between the first leg portion 12h and recess 12g.

The leg portions and recesses of upper and lower frame members 11 and 12 are tapered toward their distal ends to be smoothly coupled with the corresponding recesses and portions. When the leg portions and recesses of upper frame member 11 have been engaged with the corresponding recesses and leg portions of lower frame member 12, the hooks 11g1, 11h1 of upper frame member 11 are engaged with the hooks 12g1, 12h1 of lower frame member 12 respectively. In a condition where the upper frame member 11 has been coupled with the lower frame member 12 in such a manner as described above, the support shafts 12j and 12k are located at each central portion of the side walls of the outer frame assembly.

As shown in FIGS. 7(a)–7(c), the central adjustment blade 13 has a flat blade body 13a integrally formed at its upper and lower ends with a pair of vertically spaced pivot shafts 18b, 18c and at its rear shoulder with a pivot shaft 13d. The central adjustment blade 13 has a manual knob 13e integrally formed therewith at its front side. As shown in FIGS. 8(a)–8(c), each of the side adjustment blades 14 has a flat blade body 14a integrally formed at its upper and lower ends with a pair of vertically spaced pivot shafts 14b, 14c and at its rear shoulder with a pivot shaft 14d.

In the register 10, the upper and lower frame members 11 and 12 are integrally coupled with each other in a condition where the upper and lower pivot shafts 13b, 13c, 14b, 14c of the adjustment blades 13, 14 have been engaged with the corresponding holes 11e, 12e of the frame members 11, 12, and the link member 15 is engaged with the pivot shafts 13d, 14d of adjustment blades 13, 14. In such an assembled condition of the frame members 11 and 12, the leg portions 11f, 11g and recesses 11h 11i of the respective side wall portions 11b, 11c are engaged with the corresponding recesses 12f, 12g and leg portions 12h and 12i of the respective side wall portions 12b, 12c, and the hooks 11h1, 11g1 are engaged with the corresponding hooks 12h1 and 12g1. In the register 10 assembled as described above, the adjustment blade 13 is located at the center of the outer frame assembly, the manual knob 13e slightly protrudes forward between the lattice members 11d and 12d, and the support shafts 12j, 12k protrudes outwardly from the side wails of the outer frame assembly.

In the register 10, the pivot shafts 13b, 13c, 14b, 14c of the adjustment blades 13, 14 can be engaged with the corresponding holes 11e, 12e of the upper and lower frame members 11 and 12 without any difference in engagement lead so that the adjustment blades 13, 14 are smoothly operated.

Illustrated in FIGS. 9–12 is a molding device 20 mounted on a support mechanism 30 of an injection molding machine. As shown in FIG. 9, the support mechanism 30 of the injection molding machine has a stationary die plate 32 fixedly mounted on a pair of parallel guide shafts 31 and a movable die plate 33 slidably mounted on the guide shafts 31. The molding device 20 is comprised of a stationary plate assembly 20a and a movable plate assembly 20b which are disposed between the die plates 32 and 33. As shown in FIG. 10, the stationary plate assembly 20a includes a mounting plate 21a, an intermediate plate 22a and a molding block 23a, while the movable plate assembly includes a mounting plate 21b, Intermediate plates 22b and a molding block 23b. A pair of spacer blocks 24a are disposed between the mounting plate 21b and intermediate plate 22b to form a space in which arranged is an ejector plate 24b.

The stationary plate assembly 20a and movable plate assembly 20b are connected to each other by means of plural support pins 24c1, 24c2 and longitudinal connecting plates 24d as shown in FIG. 11. In the movable plate assembly 20b, the intermediate plate 22b and molding block 23b are connected to each other by means of connecting plates 24e. As shown in FIG. 9, the molding device 20 is mounted on the support mechanism 30 of the injection molding machine in such a manner that the mounting plate 21a of stationary plate assembly 20a is assembled with the stationary die plate 32 while the mounting plate 21b of movable plate assembly 20b is assembled with the movable die plate 33. The injection molding machine has a hydraulic cylinder 34 which is arranged to move the movable die plate 33 toward and away from the stationary die plate 32.

As shown in FIGS. 11 and 12, a pair of laterally spaced first slide cores 25a, a pair of vertically spaced second slide cores 25b, a third slide core 25c and a core block assembly 25d are mounted on the molding block 23b of the movable plate assembly 20b to be moved respectively by means of a pair of first pneumatic actuators 26a, a pair of angular pins 26b and a second pneumatic actuator 26c. The first slide cores 25a each are formed at their inner ends with a molding surface partly forming the upper and lower frame bodies 11a, 12a of the frame members 11, 12, respectively. The first pneumatic actuators 26a each are in the form of an air cylinder which is connected to the respective slide cores 25a. As shown in FIG. 11, the second slide cores 25b each are formed at their inner ends with a molding surface partly forming the side wall portions 11c, 11b, 12b, 12c of the frame members 11, 12. The second slide cores 25b are slidably disposed within a pair of spaced vertical grooves formed on one side of the molding block 23b perpendicularly to the first slide cores 25a. A pair of opposed guide rods 26d are slidably carried by a pair of vertically spaced support members 26e fixed to the molding block 28b and connected at their inner ends to the second slide cores 25b to guide movement of the slide cores 25b. The second slide cores 25b each are formed with a diagonal through hole into which each of the angular pins 26b is slidably inserted. The angular pins 26b are fixed to the molding block 28a of the stationary plate assembly 20a to cause inward or outward movement of the second slide cores 25b when the molding block 23b is moved toward and away from the molding block 23a.

As shown in FIG. 12, the third slide core 25c is positioned adjacent one of the first slide cores 25a and connected to the second pneumatic actuator 26c in the form of all air cylinder the construction of which is substantially the same as that of the air cylinder 26a. The third slide core 25c is formed at its inner end with a molding surface forming the link member 15. As shown in FIGS. 11 and 12, the core block assembly 25d. Is comprised of first and second blocks 25d1 and 25d2. The first block 25d1 is fixed to the central portion of the intermediate plate 22b and is slidably disposed between the first slide cores 25a and between the second slide cores 25b through the central portion of the molding block 23b. The first block 25d1 is formed at its inner end with a molding surface forming each rear portion of the adjustment blades 13, 14. The second block 25d2 is slidably coupled within the central portion of first block 25d1 and connected to the ejector plate 24b by means of an ejector pin 25d3. The second block 25d2 extends inwardly in a predetermined length from an inner end surface of the first block 25d1 to support each molded adjustment blade.

The molding block 23e of stationary plate assembly 20a is formed with a molding surface forming each front portion of the frame members 11, 12 and adjustment blades 13, 14. In a condition where the movable plate assembly 20b has been united with the stationary plate assembly 20a, the molding block 23a is associated with the first and second slide cores 25a and 25b to form the frame members 11 and 12 and is associated with the core block assembly 25d to form the adjustment blades 13, 14. In addition, the core block assembly 25d is associated with the third slide core 25c to form the link member 15.

In the molding device 20, the connecting plates 24d each are formed with an elongated hole 24d1 through which fastening bolts 24d2, 24d3 are threaded into the molding blocks 23e and 23b and fastened to retain the connecting plate 24d in place. When the fastening bolts 24d2, 24d3 are released, both the molding plates 23a, 23b can be separated to one another along the elongated slot 24d1 of the connecting plate 24d. The connecting places 24e each are fixed at their one ends to the side face of molding block 23b. The connecting plates 24e each are formed with an elongated hole 24e1 through which a fastening bolt 24e2 is threaded into the side face of the intermediate plate 22. When the fastening bolt 24e2 is released, the intermediate plate 22b can be separated from the molding block 23b along the elongated hole 24e1 of the connecting plate 24e, Assuming that the molding device 20 has been mounted on the support mechanism 30 of the injection molding machine as shown in FIG. 9 to manufacture the register 10, molten synthetic resin is injected into the interior of the molding device 20 through an inlet ring 21a1 mounted to the mounting plate 21a to separately form the frame members 11, 12, adjustment blades 13, 14 and link member 15 of the register 10. After the component parts of the register has been completely formed, the hydraulic cylinder 34 is operated to retract the movable plate assembly 20b from the stationary plate assembly 20a so that the molding block 23b of the movable plate assembly 20b is separated from the molding block 23a of the stationary plate assembly 20a in a distance defined by the elongated holes 24d1 of connecting plates 24d. Simultaneously, the intermediate plate 22b is separated from the molding block 23b in a distance defined by the elongated holes 24e1 of the connecting plates 24e so that the first block 25d1 of core block assembly 25d is retracted in a condition where the second block 25d2 is still retained in place. When the movable plate assembly 20b is separated from the stationary plate assembly 20a, the angular pins 26b cause the second slide cores 25b to retract outwardly.

In such a manner as described above, the second slide cores 25b are retracted from the second block 25d2, while the first block 25d1 of core block assembly 25d is retracted from the first and third slide cores 25a and 25d. Thus, first and third slide cores 25a and 25c can be moved toward the second block 25d2 of core block assembly 25d in a condition where the adjustment blade 13, 14 are being carried by the second block 25d2. When the first slide cores 25a are moved toward the second block 25d2 by operation of the first pneumatic actuators 26a, the frame members 11, 12 are integrally coupled with each other at their side wall portions so that each pivot shaft of the adjustment blades 13, 14 is engaged with the corresponding hole of the respective frame members 11, 12. When the third slide core 25c is moved toward the second block 25d2 by operation of the second pneumatic actuator 26c, the link member 15 is engaged with the pivot shafts of the adjustment blades 13, 14 retained by the second block 25d2. As a result, the adjustment blades 13, 14 are interconnected by engagement with the link member 15 to complete assembly of the register 10. Thereafter, the ejector pin 24d3 is moved forward by operation of the ejector plate 24b to remove the register 10 from the second block 25d2.

From the above description, it will be understood that the molding device 20 is adapted to separately form the frame members 11, 12, adjustment blades 13, 14 and link member 15 of the register 10 thereby to assemble the adjustment blades 13, 14 with the frame members 11, 12 and to engage the link member is with the adjustment blades 13, 14. With the molding device 20, the register 10 can be completely assembled during the molding process without manual work required heretofore for connecting the link member 15 with the adjustment blades 13 and 14.

What is claimed is:

1. A molding device for a register of synthetic resin adapted for use in adjustment of air flow, the register being comprised of an outer frame assembly, a plurality of spaced adjustment blades assembled within the outer frame assembly to be pivotally moved and a link member pivotally engaged with each rear shoulder of the adjustment blades for interconnection of the adjustment blades, the outer frame assembly being comprised of a pair of outer frame members each having a frame body integral with a pair of opposed side wall portions and being integrally coupled with each other at their side wall portions to form the outer frame assembly, wherein the molding device comprises a pair of opposed first slide cores each formed with a molding surface forming each frame body of the outer frame members, a pair of opposed second slide cores arranged perpendicularly to said first slide cores, said second slide cores each being formed with a molding surface forming each side wall portion of the outer frame members, a third slide core positioned adjacent one of said first slide cores, said third slide core being formed with a molding surface forming the link member, and a core block arranged to be disposed between said first and second slide cores, said core block being formed with a molding surface forming the adjustment blades, and wherein said molding device further comprises first actuator means for moving said first slide cores toward and away from said core block so that in a condition where said first slide cores have been moved toward said core block, the outer frame members are coupled with each other at their side wall portions and engaged with the adjustment blades carried by said core block; guide means for moving said second slide cores outwardly when said core block has been retracted; and second actuator means for moving said third slide core toward said core block so that the link member is engaged with the adjustment blades carried by said core block.

2. A molding device as claimed in claim 1, wherein said first, second and third slide cores and said core block are carried by a movable plate assembly mounted on a support mechanism of an injection molding machine.

3. A molding device as claimed in claim 2, wherein said guide means comprises a pair of angular pins fixed to a stationary plate assembly mounted on the support mechanism of the injection molding machine and slidably engaged with said second slide cores.

* * * * *